(12) United States Patent
Janssen

(10) Patent No.: US 7,168,251 B1
(45) Date of Patent: Jan. 30, 2007

(54) WIND ENERGY TURBINE

(75) Inventor: Wilhelm Janssen, Saterland (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/302,628

(22) Filed: Dec. 14, 2005

(51) Int. Cl.
*F01K 27/00* (2006.01)
(52) U.S. Cl. .................. 60/641.1; 415/4.3; 415/4.5
(58) Field of Classification Search ........... 60/641.1; 415/4.3, 4.5, 175, 177; 290/44, 55
See application file for complete search history.

(56) References Cited

U.S. PATENT DOCUMENTS

| | | | |
|---|---|---|---|
| 6,285,090 B1 * | 9/2001 | Brutsaert et al. ............ 290/55 |
| 6,520,737 B1 * | 2/2003 | Fischer et al. ............... 415/4.3 |
| 6,676,122 B1 * | 1/2004 | Wobben ...................... 290/55 |
| 2005/0167989 A1 * | 8/2005 | Kruger-Gotzmann et al. ........................ 290/55 |

* cited by examiner

*Primary Examiner*—Hoang Nguyen
(74) *Attorney, Agent, or Firm*—James E. Mcginness, Esq.; Armstrong Teasdale LLP

(57) ABSTRACT

A wind energy turbine includes a tower, a nacelle rotatably supported by the tower, a rotor rotatably supported by the nacelle, and at least one unit to be cooled and arranged in the tower and/or the nacelle. The unit is adapted to be cooled by a cooling medium flowing in a cooling circuit from the unit to at least one heat exchanger. The at least one heat exchanger is located outside of the tower and/or nacelle and configured to be cooled by ambient air.

10 Claims, 2 Drawing Sheets

WIND ENERGY TURBINE

BACKGROUND OF THE INVENTION

This invention relates generally to a wind energy turbine having at least one unit or component to be cooled, and, in particular, to cooling at least one component or unit of a wind energy turbine using a cooling fluid.

A wind energy turbine comprises several mechanical and electrical components which generate heat energy losses during their operation. These components or units include, for example, a gear box (if provided) and a generator. Both of these are typically arranged in the nacelle rotatably supported by a tower. The components also include a converter and a transformer, both of which are typically located within the tower and are utilized to feed electrical energy converted from the mechanical energy of the rotor via the generator into the grid. In addition, the components include controllers for controlling operation of the wind energy turbine. The controllers are typically arranged within the tower. Due to the increased performance of modern wind energy turbines, effective cooling of the above-mentioned components is increasingly difficult.

Typically, the units and components of a wind energy turbine to be cooled are arranged within an cooling air stream generated by fans. However, in particular with respect to the units to be cooled and arranged in the tower of a wind energy turbine, it is difficult to feed enough air into the tower for sufficiently cooling the components.

As shown in WO-A-01/006121 a wind energy turbine is known having an air cooling circuit for cooling heat-energy-generating units of the turbine. The cooling air circuit uses the wall of the tower as the heat exchanger and cooling surface for cooling the air.

BRIEF DESCRIPTION OF THE INVENTION

In one aspect, a wind energy turbine is provided that includes a tower, a nacelle supported by the tower, a rotor supported by the nacelle, and at least one unit to be cooled and arranged in the tower and/or the nacelle. The unit is adapted to be cooled by a cooling medium flowing in a cooling circuit from the unit to at least one heat exchanger, and the at least one heat exchanger is located outside of the tower and/or nacelle and configured to be cooled by ambient air.

According to another aspect of the present invention, there is provided a method for cooling a unit of a wind energy turbine comprising the steps of flowing cooling medium along the unit to be cooled to at least one heat exchanger arranged at an outer side of the wind energy turbine, and cooling the cooling medium in the heat exchanger by ambient air.

DETAILED DESCRIPTION OF THE INVENTION

Figure 1:
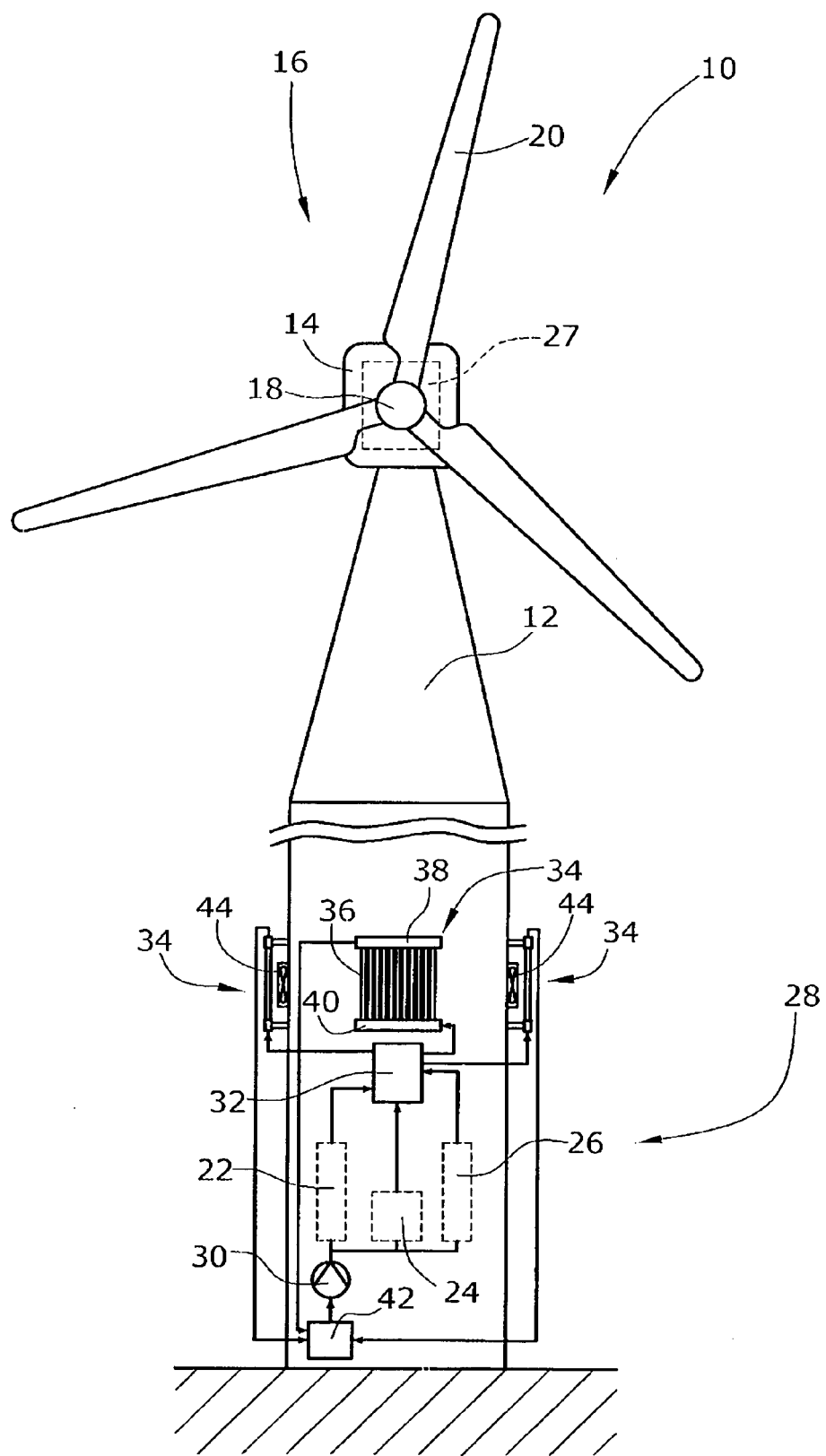
FIG. 1 is a schematic diagram of a wind energy turbine showing the closed cooling liquid circuit.

The present invention involves a cooling circuit for a wind energy turbine built as an open loop, partially closed loop, or a completely closed loop. A cooling medium (gas or liquid) flows through the cooling circuit from the at least one unit to be cooled to at least one heat exchanger or cooling element for cooling down the cooling medium. According to one embodiment of the invention, at least one heat exchanger is located outside of the wind energy turbine and, in particular, on an outer side of the tower and/or nacelle of the wind energy turbine so that it can be cooled by ambient air and wind.

In one embodiment, the cooling components are used in a closed loop cooling circuit with a cooling medium provided as a cooling liquid, e.g. water. The unit or component to be cooled is cooled by the cooling liquid flowing through the unit or component or parts thereof and downstream of the unit or component through at least one heat exchanger located on the outer side of the tower and/or the nacelle. Thereafter, the cooling liquid flows back to the unit or component to be cooled. A pump or similar element is also arranged in the cooling circuit.

In the exemplary embodiment, ambient air and wind are used for cooling the cooling liquid. Arranging at least one heat exchanger outside of the tower substantially improves the effectiveness of the cooling process within the heat exchanger. Since the heat exchanger is attached on the outer side of the tower and/or nacelle and spaced therefrom, the ambient air flows completely around the heat exchanger to effectively cool it. In an alternative embodiment, an air flow generated by a fan is forced through and/or along the at least one heat exchanger. In this embodiment, the heat exchanger and fan arrangement are located e.g. underneath the stairs leading to the tower door. In addition, the fan is arranged at the outer side of the tower or nacelle where the at least one heat exchanger is typically located. Typically, the heat exchanger includes multiple tubes arranged parallel to each other and connected in parallel or in series. When connected in series, the ends of all the tubes are connected to two collection tubes, one of them provided for the heated cooling liquid flowing into the heat exchanger and the other for the cooled cooling liquid flowing out of the heat exchanger.

In alternative embodiments, to further improve the efficiency of cooling the cooling medium, multiple heat exchangers are arranged along the outer circumference of the tower and/or an outer side of the nacelle. The multiple heat exchangers are connected in either series or parallel to each other. In both cases it can be advantageous to cause the cooling medium to flow through selective ones of the heat exchangers, e.g. by closing one or more heat exchangers when connected parallel to each other, for which purpose, in a manifold or the like on/off valves are provided. Alternatively, one or more of the heat exchangers are bypassed when connected in series. The selective use of the heat exchangers makes it possible to e.g. deactivate those heat exchangers which are subjected to ambient heat e.g. due to solar radiation. Accordingly, depending on the position of the sun, the intensity of the solar radiation, the air temperature and/or wind speed, different heat exchangers can be switched on or off so as to use those heat exchangers which are located in the shadow or in partial shadow of the sun. For example activating a heat exchanger subjected to solar radiation can still make sense if the ambient air temperature is low and/or the respective heat exchanger is subjected to air flow due to the ambient wind.

More specifically, FIG. 1 illustrates one embodiment of the present invention in which a wind energy turbine 10 comprises a tubular tower 12 and a nacelle 14 rotatably supported at a top of tower 12. A rotor 16 is rotatably supported by nacelle 14 and includes a hub 18 and at least one rotor blade 20. In this embodiment, rotor 16 includes three rotor blades 20. However, the number of rotor blades as well as whether the wind energy turbine is of the vertically rotating rotor type or of the horizontally rotating rotor type, are not essential and this invention applies to both.

Within tower 12, there are arranged a frequency converter 22, a transformer 24, and a controller 26 which are used to convert electrical energy generated by a generator 27 of nacelle 14 and for feeding the electrical energy into a power grid. Frequency converter 22, transformer 24, controller 26, generator 27, and a gear box (not shown) of nacelle 14 generate energy losses in the form of heat. Accordingly, these components of wind energy turbine 10 have to be cooled. For this purpose, wind energy turbine 10 includes a specific cooling system which in the drawings is shown for cooling at least one of the components (converter 22, transformer 24, and controller 26) located in tower 12.

Tower 12 includes, in the exemplary embodiment, a cooling system 28 built as a completely closed cooling circuit having diverse pipes and elements described hereinafter. Whether or not the cooling circuit is closed is not critical for the invention. The invention can also include an open cooling circuit.

Figure 2:
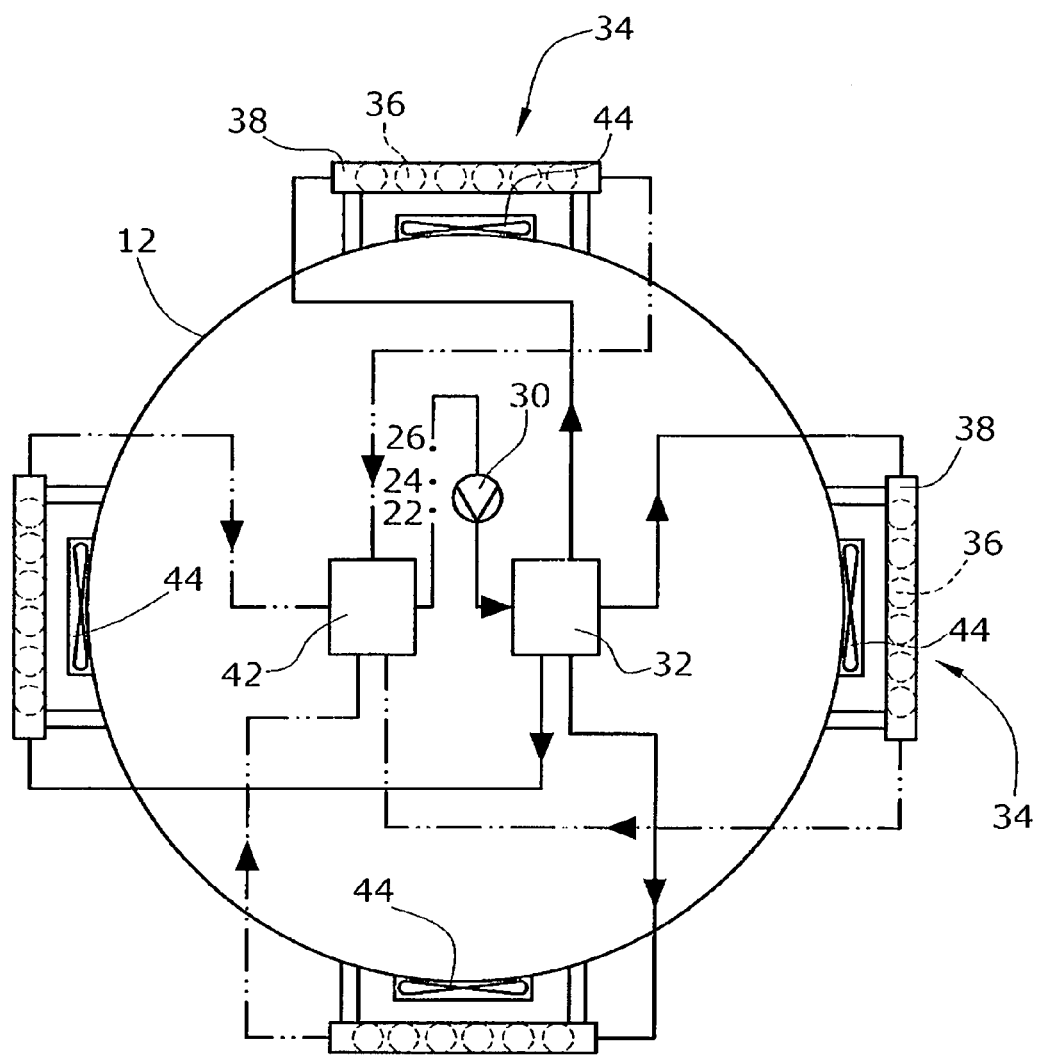
FIG. 2 is a more detailed view of the cooling liquid circuit.

Cooling system 28 includes a pump 30 for pumping cooling water through a tube and manifold system as explained. Pump 30 feeds the cooling water through the units and components to be cooled (e.g. frequency converter 22, transformer 24, and/or controller 26, as well as generator 27 and/or the gear box) for cooling these units or components directly or indirectly by e.g. internal heat exchangers. Downstream of the units and components to be cooled, a manifold 32 is provided in cooling system 28 for distributing the cooling water heated due to the cooling of the units and components to be cooled to multiple heat exchangers 34 arranged outside of tower 12 and attached to the outer side thereof as well as distributed along the peripheral wall of tower 12. Each heat exchanger 34 in this embodiment includes a plurality of tubes 36 connecting upper and lower collecting tubes 38, 40. One of these collecting tubes is in fluid communication with the manifold 32 while the other collecting tube is in fluid communication with another manifold 42 which in turn is connected to pump 30 so as to establish the closed cooling circuit of cooling system 28 as shown in FIGS. 1 and 2. It is to be noted that in FIGS. 1 and 2 the fluid connection within the cooling system is shown schematically. Vertically oriented lines do not necessarily reflect the orientation of the individual pipes. Also the pipes can include cooling fins (not shown).

At least one of manifolds 32 and 42 is provided with valves for selectively connecting the respective manifold to heat exchangers 34. These valves make it possible to selectively use specific ones of heat exchangers 34 for cooling purposes. This in turn can be advantageous in that a heat exchanger 34 which is e.g. heated due to solar radiation, can be shut off from the cooling circuit because such a heat exchanger might not cool the cooling water effectively enough or in a worse case may result in a further heating-up of the cooling water.

The present invention is described in this embodiment with respect to a specific type of heat exchanger 34 as well as a specific arrangement of heat exchangers 34 around tower 12 substantially on one common level. It is to be noted that the type of heat exchanger as well as the aspect of whether the heat exchangers are connected in series or parallel to each other as well as the number and arrangement of the heat exchangers at one or a plurality of different height levels is not important for the invention. The invention utilizes heat exchangers or cooling elements for a cooling medium (liquid or gas) which heat exchangers or cooling elements are arranged outside of the wind energy turbine, e.g. at the outer side of the nacelle 14 and/or tower 12. As indicated in FIG. 2 by reference numeral 44, in one embodiment, at least one fan is associated with at least one of heat exchangers 34 for actively feeding air to heat exchanger 34 in addition to the air flow from the wind.

Accordingly, although the invention has been described and illustrated with reference to a specific illustrative embodiment thereof, it is not intended that the invention be limited to this illustrative embodiment. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A wind energy turbine comprising
   a tower;
   a nacelle rotatably supported by said tower;
   a rotor rotatably supported by said nacelle;
   at least one unit to be cooled and arranged in at least one of said tower and said nacelle;
   at least one heat exchanger located outside at least one of said tower and said nacelle, said at least one heat exchanger configured to be cooled by ambient air; and
   a cooling circuit providing flow communication between said at least one unit and said at least one heat exchanger, said cooling circuit containing a cooling medium flowing between said unit and said at least one heat exchanger for facilitating cooling said unit.

2. The wind energy turbine according to claim 1 wherein said cooling circuit includes multiple heat exchangers connected in at least one of series and parallel to each other and arranged along an outer circumference of at least one of said tower and an outer side of said nacelle.

3. The wind energy turbine according to claim 2 further comprising a manifold for selectively guiding the cooling medium to at least one of said multiple heat exchangers.

4. The wind energy turbine according to claim 1 wherein said cooling circuit is a closed loop.

5. The wind energy turbine according to claim 1 wherein said cooling circuit comprises at least one pump for pumping the cooling medium from said unit to said at least one heat exchanger.

6. The wind energy turbine according to claim 2 wherein said cooling circuit further comprises a first manifold arranged upstream and a second manifold arranged downstream of said multiple heat exchangers.

7. The wind energy turbine according to claim 1 further comprising a fan in flow communication with said at least one heat exchanger and configured to generate an air flow for cooling said at least one heat exchanger.

8. A method for cooling a unit of a wind energy turbine comprising the steps of:
   providing a cooling medium along the unit to be cooled to at least one heat exchanger arranged at an outer side of the wind energy turbine; and cooling the cooling medium in the heat exchanger with ambient air.

9. The method according to claim 8 further comprising the step of guiding the cooling medium to at least one selective heat exchanger of a plurality of heat exchangers located within different areas of the outer side of the wind energy turbine.

10. The method according to claim 8 wherein the step of providing cooling medium comprises pumping the cooling medium through a closed loop cooling circuit comprising the unit to be cooled and the at least one heat exchanger.

* * * * *